United States Patent Office.

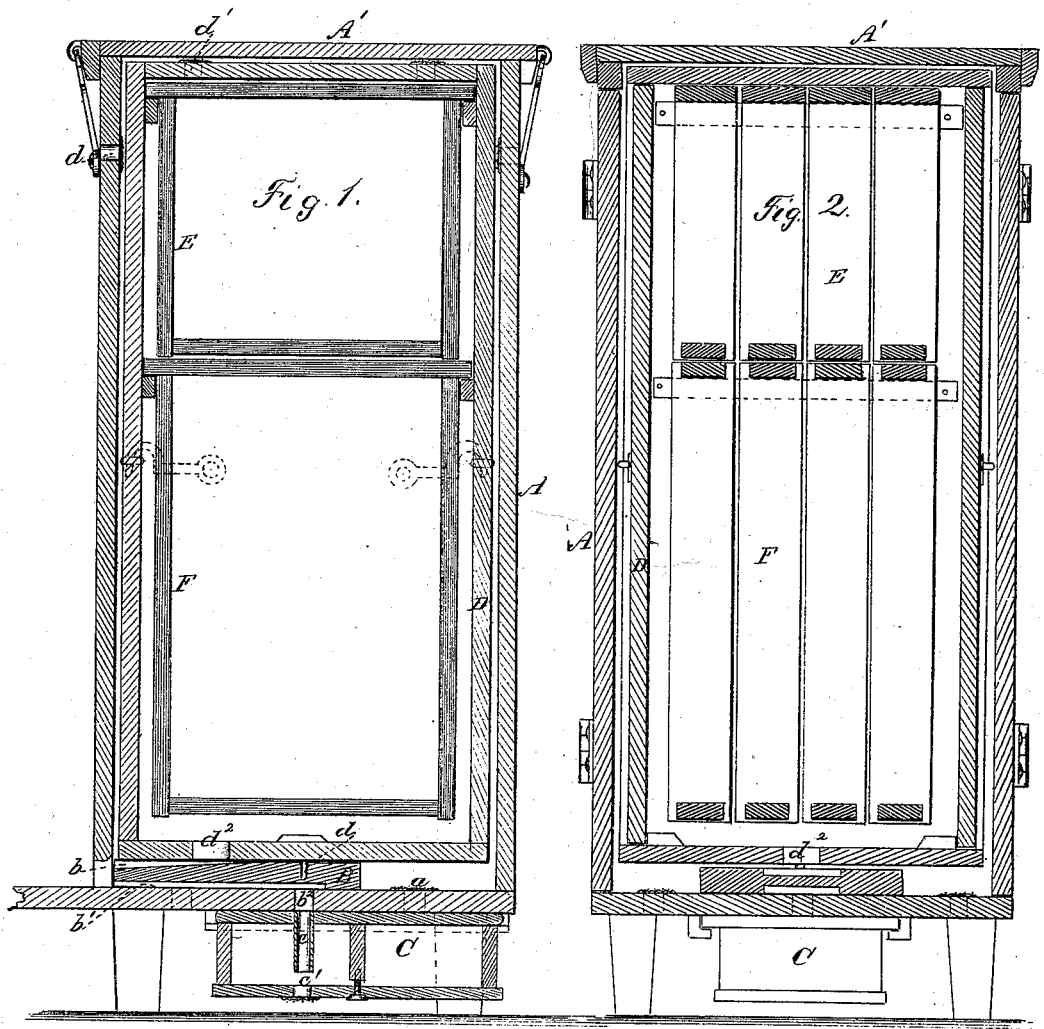
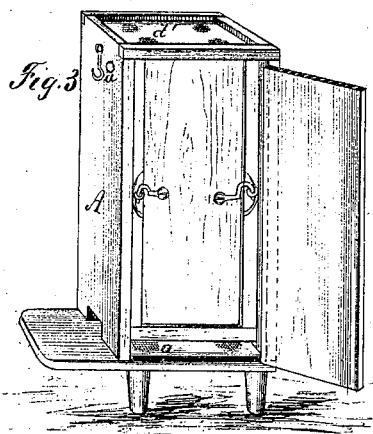

WILLIAM WAMBACH, OF INDIANAPOLIS, INDIANA.

Letters Patent No. 111,283, dated January 24, 1871.

IMPROVEMENT IN BEE-HIVES.

The Schedule referred to in these Letters Patent and making part of the same.

*To all whom it may concern:*

Be it known that I, WILLIAM WAMBACH, of Indianapolis, in the county of Marion and State of Indiana, have invented certain Improvements in Bee-Hives; and I do hereby declare that the following is a full, clear, and exact description thereof, reference being had to the annexed drawing making part of this specification, in which—

Figure 1 is a vertical section of my improved bee-hive.

Figure 2 is another vertical section thereof, taken at right angles to the one shown in fig. 1.

Figure 3 is a perspective view of the hive, with the top of the outer box removed and one of its doors swung open.

The same letters are used in all the figures in the designation of identical parts.

This invention relates to bee-hives; and

My improvement consists in a novel construction and arrangement of the parts composing it, as will be more specifically pointed out in the subjoined description and claim.

To enable those skilled in the art to make and use my invention, I will proceed to describe its construction and operation.

The hive is composed of two boxes, one fitting within the other so as to leave a space upon all sides of the inner one sufficient for a free circulation of air, but too narrow to admit of bees entering it, in order to avoid the danger of crushing them.

This double box protects the bees from the cold of winter, and, by providing suitable ventilation, from suffocation during the heated term.

The outer box, marked A in the annexed drawing, is mounted upon legs, and provided with a removable top, $A^1$, which is placed upon its upper open end when it is necessary to close it, and secured by hooks and staples, as shown, or in some other convenient manner.

The front and rear are firmly secured to the base, and the sides are formed by hinged doors, $A^2$.

In the base-board of this box suitable air-passages, $a$, are formed, covered by wire-gauze to exclude vermin, and other similarly-covered openings, $a'$, are made in the upper end of the box through its sides, whereby to insure a free circulation of pure air around the interior box at all times.

The base-board at the front of the box projects a sufficient distance to form a platform for the bees, from which they gain access to the interior of the hive through the opening $b$ cut in the upper side of a thick board, B, which is secured upon the bottom of the box A.

In the under side of this board is another aperture, $b^1$, so narrow as to prevent the bees from entering it.

This aperture is designed for the entrance of moth and other insects injurious to the bees, and leads to an opening, $b^2$, in the bottom of the case A, which opening is covered by a drawer, C.

A short tube, $c$, furnishes an entrance to the drawer directly under the opening $b^2$, and in order to attract the moth to enter said drawer, light is admitted into the same through a gauze-covered window, $c'$, arranged vertically under the entrance-tube, as clearly shown in fig. 1.

The drawer is to be removed from time to time to clear out the insects which may have collected in it.

The interior box D rests with its bottom upon the board B, and is held in proper position with reference to the outer box by a pin, $d$, secured in it, and which enters a socket in said board B, as shown.

Both ends of this inner box are permanently closed by suitable heads provided with gauze-covered perforations, $d^1$, to insure a proper ventilation.

A hole, $d^2$, is made in its bottom, communicating with the opening $b$, for the ingress and egress of the bees.

This box is provided with two series of comb-frames, an upper one, E, and a lower one, F, suspended upon cleats nailed to the front and rear sides of the box.

The horizontal or cross-bars of the comb-frames are made narrower than their vertical bars, so as to leave a sufficient space between such cross-bars of two adjacent frames, when inserted in the hive, to permit of a free passage of the bees from the lower series to the upper, and *vice versa.*

The comb-frames are inserted in and removed from the box through the removable sides D' of the same, which are held in place by hooks and staples in the manner shown.

These removable sides of the inner box being opposite the doors of the outer one, easy access can be had to the comb-frames for the purpose of removing honey or transferring the brood.

What I claim as my invention, and desire to secure by Letters Patent, is—

The arrangement, with reference to one another, of the case or box A, interior box D, with air-passages between the two, comb-frames E F, and moth-drawer C, substantially as set forth.

In testimony whereof I have signed my name to this specification in the presence of two subscribing witnesses.

WILLIAM WAMBACH.

Witnesses:
WILLIAM LIRE,
GEO. T. MORTON.